L. KELLY.
HAY SPREADER FOR BARNS.
APPLICATION FILED JULY 29, 1918.

1,283,796.

Patented Nov. 5, 1918.

INVENTOR:
Lawrence Kelly.
BY his ATTORNEY:
A. M. Carlsen.

UNITED STATES PATENT OFFICE.

LAWRENCE KELLY, OF ST. PAUL, MINNESOTA.

HAY-SPREADER FOR BARNS.

1,283,796.

Specification of Letters Patent.

Patented Nov. 5, 1918.

Application filed July 29, 1918. Serial No. 247,336.

*To all whom it may concern:*

Be it known that I, LAWRENCE KELLY, a citizen of the United States, residing at St. Paul, in the county of Ramsey and State of Minnesota, have invented a new and useful Hay-Spreader for Barns, of which the following is a specification.

My invention relates to hay spreading devices for use in barns. As a rule hay is of late years filled into barns by hauling it on a wagon to the middle of the barn floor and is then hoisted in several charges up from the wagon fairly near to the roof, and there each charge is automatically attached to a carrier or carriage riding on a track arranged in under the highest point of the barn roof; the carriage is then moved along the track to the desired place and a cord is pulled which releases the charge of hay so it drops into the middle of the mow for which it was destined. This process creates a ridge of hay along the middle of the barn floor while the barn is empty near the walls, and it requires considerable time and manual labor to spread said hay over to the walls so that further hay may be dropped at the middle of the barn.

The object of my invention is to save the cost of labor and time thus wasted, by furnishing the barn with a device which when the hay is dropped upon it will automatically distribute the hay toward the walls, and then deposit the next hay farther and farther toward the middle of the floor, and finally permit the central and higher part of the barn to be filled.

Figure 1:
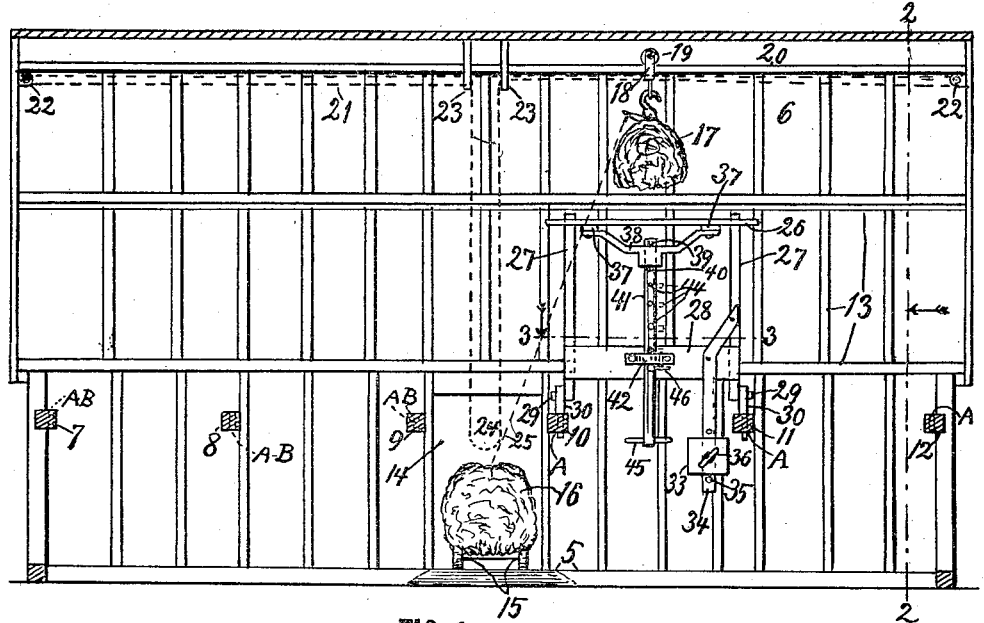
Figure 2:
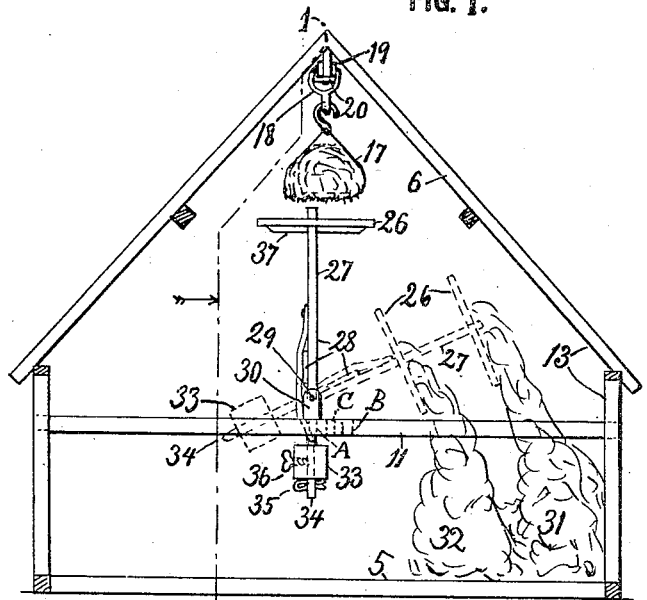
Figure 3:
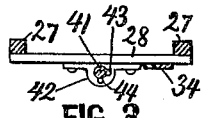
Figure 4:
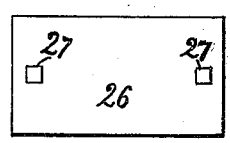

In the accompanying drawing, Figure 1 is a vertical section as on the line 1—1 of Fig. 2 of a barn equipped with my hay spreader. Fig. 2 is a cross section as on the line 2—2 of Fig. 1, with some parts omitted. Fig. 3 is a section on the line 3—3 of Fig. 1, showing more clearly the structure of some of the parts of the spreader. Fig. 4 is a top view of the platform of the spreader and the arms on which it is slidable.

Referring to the drawing by reference numerals, 5 designates the floor, 6 the roof and 7 to 12 are transverse beams about eight feet up in the frame structure 13 of the barn.

As a rule such barn is provided with two opposite side door openings, 14, one of which is shown in Fig. 1, so a hay wagon 15 may be driven across the floor of the barn, stopping at the middle of the floor while being unloaded. The various hoisting devices by which the hay is raised from the wagon being well known I will not here describe them, but the hay is raised in charges similar to 17 and carried by some form of carriage 18, having wheels 19 rolling on a track 20 along the top of the roof; the carriage being moved by a rope 21, which extends over sheaves 22 and through guiding hangers 23, below which it forms a bight 24 by which the operator standing on the load may operate the cord and thus move the carriage to and from the different places of the barn, whereupon he pulls a cord 25 and thereby trips the fork, or sling, as the case may be, holding the charge of hay, so the hay may drop into the desired mow, either between the beams 7—8, 8—9, 10—11 or 11 and 12.

Now to cause the dropped hay to spread as shown to the right in Fig. 2, it is dropped upon a platform 26, which is adjustable up and down on the uprights or posts 27 of a frame 27—28. Said frame is trunnioned at 29 in two brackets 30, so as to swing or tilt with the top toward either side of the barn when hay is dropped upon the platform, and when the hay is slid off from the platform, as at 31 and 32 in Fig. 2, a weight 33 returns the frame and its empty platform to the upward position again. Said weight 33 is adjustably supported on an arm 34 of the frame by a cotter pin 35, or a set-screw 36, or both.

To make the platform readily adjustable up and down on the posts 27 I secure to its transverse cleats 37 a two-armed spider 38, in the middle of which is rotatably retained by pins 39, 40, a vertical shaft 41, which is also journaled in a bearing 42 fixed on the part 28 of the frame; said bearing is provided with a notch 43 (see Fig. 3) in one side of its bore. Through said notch may pass up and down several pins 44, which are fixed in one side of the shaft and by resting upon the bearing 42 serve to hold the platform at the desired height so it will dump the hay at different distances from the barn walls, as indicated by dotted lines 26 and the numerals 31, 32 in Fig. 2. The bottom end of the shaft is provided with a T-shaped handle 45 by which to raise, lower and turn the shaft. 46 is a pin which will limit the raising of the shaft as it is too long to pass through the notch 43. In Fig. 1 the pins 44 are shown in solid lines in operative position and in dotted lines in idle position ready to move through the notch in the bearing.

To cause the platform to dump the hay to the desired side the brackets or posts 30 are never placed vertically below the track 20, or at the middle of the beams but either in sockets A—A or in sockets B—B in the beams (see Fig. 2), so that the weight of the hay dropped on the platform will tilt it and its frame as shown in dotted lines in Fig. 2, provided the brackets are in the apertures or sockets A, and if they be in the sockets B the platform and frame will tilt in the reverse direction. The letter C in Fig. 2 indicates that if so desired centrally located sockets may be employed, but in that case it will most likely become necessary to have a person so stationed that he can, either by a cord or by hand start the tilting of the spreader into the desired direction at the moment it is to tilt and dump the hay, If the barn is a long one so it is desired to move the spreader to different parts of it, the same device (not shown) that hoists up the hay may be attached to the spreader to lift it and move it to sockets in either pair of beams, 7—8, 8—9, 10—11 or 11—12 and the carriage 18 operated accordingly in dropping the hay over each new mow to which the spreader has been moved. When the spreader has thus been used to its limit, usually starting to fill hay near the walls and then farther and farther in from each wall, the central groove in the accumulated hay can then easily be filled directly from the carrier 18 without the use of the spreader.

Having thus fully described the structure and use of my invention what I claim is:

1. In a barn having an over-head track and means for transporting and dropping charges of hay from said track, a hay spreading device mounted in the barn between the said track and the floor, said spreading device comprising a frame trunnioned to tilt with its top toward either side of the barn, a platform mounted on the frame to receive the dropped hay and dump it when the frame is tilted, and means for restoring the frame and platform to the upward position again after each dumping, said platform being movable up and down on the frame, and means for moving and holding the platform at different heights on the frame, said means for moving and holding the platform comprising a bracket secured on the frame and having an aperture with a notch in one side of it, a vertical shaft journaled in said aperture and in a bearing secured underneath the platform and prevented from sliding in the latter bearing; it also having at its lower end a horizontal handle by which to raise, lower and turn it, and at one side a series of pins adapted to move through the notch in the lower journal bearing and rest upon the bearing so as to thereby support the platform at the desired height.

2. The structure specified in claim 1, said means for restoring the frame and platform to the upward position again after each dumping consisting of a downwardly extending arm rigidly fixed on the frame, and a weight slidable on the arm, and means for securing the weight at any desired place on the arm.

In testimony whereof I affix my signature.

LAWRENCE KELLY.

Copies of this patent may be obtained for five cents each, by addressing the "Commissioner of Patents, Washington, D. C."